Oct. 8, 1935.    H. D. NEWHART    2,016,752
DISK BRAKE
Filed Sept. 11, 1929
Fig. 1.
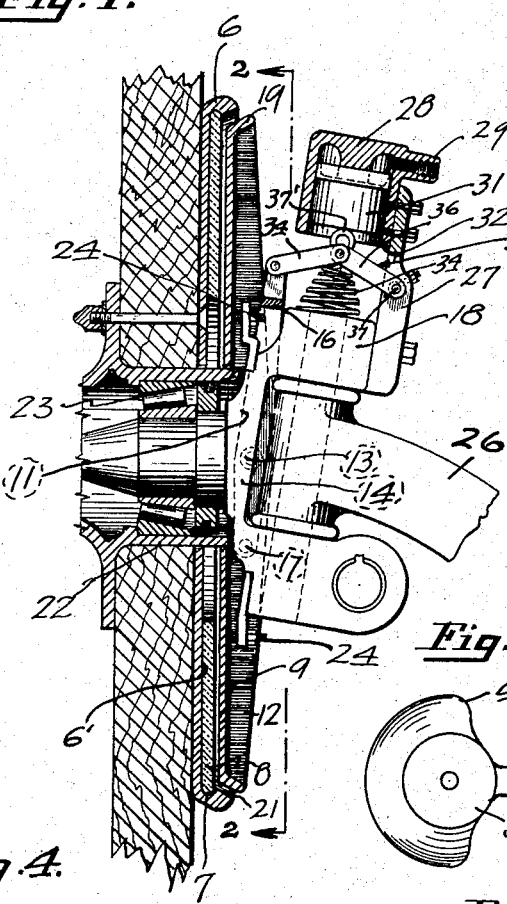
Fig. 2.
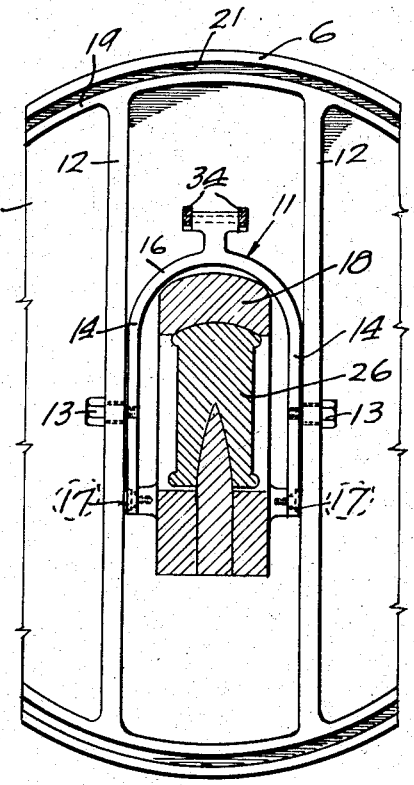
Fig. 4.
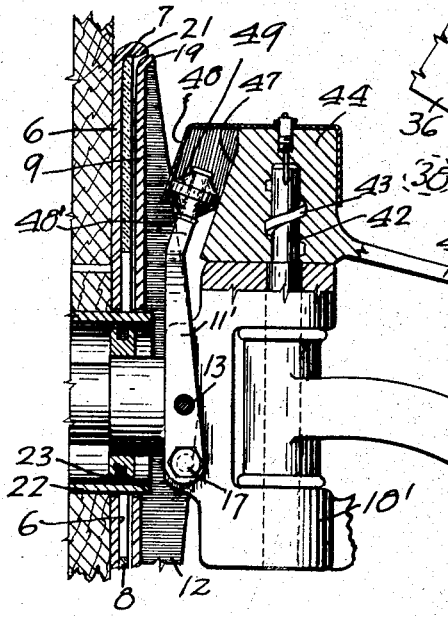
Fig. 3.
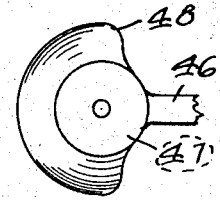
Fig. 5.
Fig. 6.
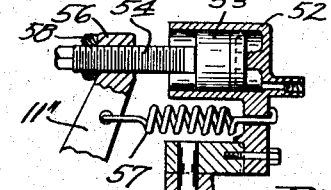
Fig. 7.
Fig. 8.
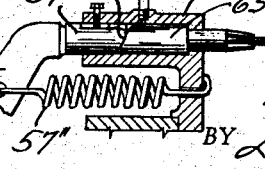
INVENTOR.
HARRY D. NEWHART
BY Lincoln V. Johnson
ATTORNEYS.

Patented Oct. 8, 1935

2,016,752

UNITED STATES PATENT OFFICE 2,016,752

DISK BRAKE

Harry D. Newhart, San Anselmo, Calif., assignor of one-half to Luke E. Robinson, Ross, Calif.

Application September 11, 1929, Serial No. 391,803

12 Claims. (Cl. 188—72)

This invention relates to friction type brakes.

The primary object of the invention is to provide a friction type brake of simple structure, which operates positively, and in which means are provided to throw off foreign particles that may be collected therein, so as to allow an efficient frictional contact therein at all times.

Another object of the invention is to provide a friction type brake, which may be operated either hydraulically or mechanically, so as to press a floating brake lining disk against a rotating disk-drum, the lining being pressed against the rotating drum by means of an actuating disk and a lever by which said actuating disk is adjustably supported and actuated.

Another object of the invention is the provision of an actuating mechanism for a friction type brake, which mechanism is adjustable to take up the wear on the lining.

Another object of the invention is the provision of a friction type brake, the actuating disk of which is supported with such flexibility as to assume a position parallel with the brake lining, when applied, whereby equalized contact thruout the entire brake disk is assured at all times.

Another object of the invention is to provide a friction type brake, the disk-drum of which rotates with a rotating element of the vehicle, and contains a floating disk lining, an actuating element being pivotally supported on an actuating element, by means of which it is moved to press the entire lining surface against the drum, creating the required frictional resistance against the rotation of said rotating element; the actuating mechanism connected to said actuating element being adapted to provide for adjustment necessitated by the wear of the lining.

Other objects and advantages are to provide a friction type brake that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing, wherein

Fig. 1 is a cross sectional view of an embodiment of my disk brake;

Fig. 2 is a sectional view of the brake, the section being taken on the line 2—2 of Fig. 1;

Fig. 3 is a detail of the toggle adjusting mechanism of the brake;

Fig. 4 is a sectional detail of an actuating mechanism for the brake;

Fig. 5 is a fragmental plan view of the actuating mechanism shown in Fig. 4;

Fig. 6 is a sectional detail of a modified form of a hydraulic actuating mechanism for the brake;

Fig. 7 is a mechanical actuating mechanism for the brake; and

Fig. 8 is a modified embodiment of the mechanical actuating mechanism for the brake.

In carrying out my invention I make use of a brake drum or disk drum 6, which is fixedly attached to a rotating element of a vehicle, such as a wheel. The disk drum 6 has an annular flange on the periphery thereof, projecting away from the wheel. Adjacent to the periphery of the inner face of the drum 6 is formed an annular groove 7, in which is positioned a circular brake lining 8, the latter having a central aperture thereon to leave the center of the disk drum 6 uncovered. Outside of the brake lining 8 and spaced therefrom is held an actuating or friction disk 9. In general the action of the brake consists in the pressing of the disk 9 which is a non-rotatable primary disk against the lining 8, whereby the latter is pressed against the disk face 6' of the drum 6, which is a rotary secondary disk thus providing the frictional resistance required to retard the rotary movement of the drum 6, and of the respective rotary element of the vehicle.

In many instances the rotary element on which the drum 6 is supported, is subjected to a slight tilting movement, such as the slight angular tilting of a vehicle wheel at turns. In such instances, if the disk 9 was moving in a fixed plane it would engage only certain points of the lining surface. Such arrangement causes uneven distribution of brake pressure on the lining, resulting in uneven wear and inefficient braking effect. In order to insure an even distribution of brake pressure and even wear, it is necessary to allow the disk 9 to assume at all times, when the brake is applied, a position parallel with the drum disk 6. To accomplish this self adjustment of the disk 9, the same is supported pivotally on an actuating lever 11. Two lugs or ribs 12 are formed on the outer face of the disk 9, one on each side of the lever 9. Thru each lug 12 extends a pivot bolt 13, which is secured in a branch 14 of the yoke 16, the latter forming an end of the actuating lever 11. The yoke 16 itself is pivotally supported on pivots 17 of a supporting bracket 18 which on the steering wheels of a vehicle constitutes a steering knuckle. It is to be noted that the pivots 13 are disposed between the pivots 18, and the free end of the lever 11. Consequently to actuate the brake the free end of the lever 11 is moved toward the drum 6, whereby the pivots 13, and the disc 9 are moved toward the disk face 6' of the drum 6, into brake applying position.

When the lever 11 is actuated so as to bring the disk 9 into contact with the lining 8, the disk 9 immediately upon its engagement with the lining 8, is moved slightly around the pivots 13, so as to assume a truly parallel position relatively to the face 6' of the drum 6, whereby the pressure is equally distributed thruout the entire friction surface of the brake.

The brake structure heretofore described also obviates the collection of foreign particles, or fluid within the drum 6. It is to be noted that the outer periphery of the disk 9 is provided with an angular flange 19, which is parallelly spaced from the chamfered edge 21 of the drum flange 7. Any fluid or particle that enters the drum 6 is thrown off, by centrifugal force, thru the peripheral aperture at said flange 19. The housing or hub 22, that usually surrounds the bearing of the rotating element, or wheel, has an annular lip 23 extending therefrom into the drum 6, and thru the central apertures of the lining 8 and disk 9. The outer edge of the lip 23 extends beyond the outer face of the disk 9, to conduct to a point outside of the drum 6, any oil or other fluid, that may escape at the wheel bearing; thus the friction surfaces of the brake are effectively protected at all times.

In order to hold the disk 9 in proper position when disengaged from the drum, set screws 24 are provided on the supporting bracket 18, to serve as abutments adjustably limiting the outward movement of the disk 9.

The stationary bracket 18, is adapted to be fixedly secured to any supporting member of the vehicle, or to be swivably mounted as a steering knuckle on the axle 26, as illustrated in Fig. 1. Upon this bracket 18 is mounted the mechanism that operates the free end of the lever 11. This actuating mechanism may be hydraulic or may be mechanical or the like.

In Fig. 1, I show a hydraulic actuating mechanism. From the bracket 18 extends upwardly an arm 27 upon which is mounted a cylinder 28, provided with the usual conduits 29, to convey fluid under pressure thereto. In the cylinder 28 is reciprocable a piston 31. The cylinder 28 is open at the end 32 thereof. Against the exposed end of the piston 31 is urged the knuckle of a toggle joint 33, by means of a coil spring 34, which spring is supported on the bracket 18. The toggle joint 33 is constructed of two toggle links 34 and 36 joined at one end thereof to each other. At the knuckle joint of said links 34 and 36 is a roller 37', that rides on the exposed end of the piston 31. The free end of the link 34 is pivoted to the free end of the lever 11. The free end of the other toggle link 36 is pivotally attached on a pin 37, which extends from the end of a cylindrical adjusting cam 38, the latter in turn being rotatably held in the arm 27. It is to be noted that the pin 37 is eccentrically located on the end of the cam 38. The cam has a circumferential groove 39 intermediate its ends, into which extends a set screw 41 threaded in the arm 27, whereby the cam 38 may be held fixedly in any adjusted position. By slightly rotating the cam 38, for instance, in contra-clockwise direction viewing Fig. 1, the pin 37 is brought upwardly and nearer to the end of the piston 31. Due to the constant urging of the spring 34, the knuckle of the toggle joint 33 is in contact with the end of the piston 31 at all times, but due to the aforementioned adjustment, the toggle knuckle shifts toward the end of the lever 11, moving the said lever end in the direction of the drum, whereby the starting position of the lever 11 is adjusted to compensate for the thickness of the lining 8, and provide the proper clearance in the brake.

In operation the introduction of fluid pressure moves the piston 31, which in turn urges the end of the toggle link 34 outwardly, whereby the lever 11 is turned to apply the brake in the afore-described manner. When the pressure is released in the cylinder 28, the action of the spring 34 returns the actuating mechanism and the brake disk to their inoperative position.

In Fig. 4, another form of actuating mechanism is illustrated. This form is particularly adapted to be used in connection with rotary elements that are turned out of their original position, such as the front or steering wheels of a vehicle. A pin 42 of a stationary element of the vehicle has a spiral thread 43 thereon, upon which is rotatably held a cam 44 in such a manner that the rotation of the cam 44 lifts or lowers the same on said thread 43. An arm 46 extending from the cam 44 connects the cam to a brake rod, not shown. The face 47 of the cam 44 is arcuate around the pin 42, and is tapered upwardly. A guard 48 secured on the cam extends over and in spaced parallel relation with the cam face 47. The free end of the lever 11' is bent as at 48' to form a bearing thereat, which extends between the inclined guard 48 and the cam face 47. On the bearing end 48' of the lever 11' is rotatably mounted a roller 49 of acorn shape adapted to ride on said cam face 47 or guard 48. When the arm 46 is turned so as to lift the cam 44, then the raising of the cam face 47 moves the lever end to turn the lever 11' and thereby to apply the brake in the manner heretofore set forth. The guard 48 moves the lever to released position when the cam face 47 and the guard 48 therewith are lowered so that the inner face of the guard 48 engages the end of the lever 11' and moves it away from the wheel. The lever 11' is pivotally mounted on the bracket 18' as heretofore set forth. The bracket 18' itself, may be either fixedly held, for instance, on the rear axle of a vehicle, or it may be attached to a movable supporting element, such as the spindle of the steering gear of the vehicle. This latter arrangement is illustrated in Fig. 4. When the front wheels of the vehicle are steered in the usual manner, then the bracket 18' moves with the spindle maintaining the brake disk in alignment with the drum. The lever 11' is permitted to follow the movement of the bracket 18', by reason of its freedom of arcuate movement over the cam face 47. Thus the disk brake is applied with equal efficiency regardless of the turning of the wheel. Therefore the disk 9 is not only self adjustable to follow the tilting of the wheel and the drum thereon, but it also follows the turning thereof out of its original plane.

Another embodiment of a brake actuating mechanism is shown in Fig. 6, wherein the hydraulic cylinder 52 is supported in a horizontal plane, the piston 53 therein is abutting against a set screw 54 which is threaded in the extended end 56 of the lever 11". A spring 57 engaged at its ends with the lever 11" and with the bracket of the brake, urges the lever 11" and set screw 54 against the piston 53. The set screw 54 is held in any adjusted position by means of a lock nut 58. The reciprocation of the piston 53 actuates the brake in the manner heretofore set forth.

In Fig. 7 a mechanical actuating device is illustrated. The end of the lever 11, in this instance is urged by the spring 57' into direct abutment against the end of a screw shaft 59, which latter is threaded in the bracket member 61. The free end of the screw shaft 59 terminates in a reduced, splined portion 62, upon which is secured a lever arm 63 by a locknut 64. The aperture in the head of the lever arm 63 is adapted to engage said splined shaft portion 62. The rotation of the arm 63 causes the axial advancement of the shaft 59, whereby the brake actuating lever 11 is operated. Adjustment in this instance can be effected by removing the arm 63 and arranging the same in a desired angular position.

The form of actuating mechanism illustrated in Fig. 8 is similar to the one shown in Fig. 7, except that instead of the screw shaft 59, a plain shaft 65 is supported in the bracket. The end of the shaft 65 is formed in the shape of a cam 66, which engages another cam 67, the latter being positioned in the bracket between the cam 66 and the end of the lever 11. When the shaft 65 is rotated it causes the axial advancement of the cam 67, thus operating the lever 11, urged against it by the spring 57".

It will be recognized that a particularly efficient disk brake is provided which is simple in construction, and positive in operation. The disk of the brake is self-adjusting in regard to the tilting of the rotary element to which it is applied; it is also self adjustable, if so mounted, to follow the turning movement of the rotary element. The particular construction of the brake obviates any accumulation of foreign particles or fluid in the brake, therefore my disk brake readily lends itself to efficient hard usage in connection with either the rear or the front wheels of a vehicle, or with any other rotary element of any device to which a brake is applicable.

Having thus described this invention what I claim and desire to secure by Letters Patent is:

1. In a brake of the character described, a brake disk drum; a lining disk to engage a disk face of the drum; a non-rotatable friction disk to exert a pressure on the lining and on said drum face; means to tiltably support said friction disk with freedom of self-adjustment to a parallel position with the said drum face, and to move said friction disk toward and away from said drum face; and a projection around the drum periphery extending toward said friction disk and being spaced from the periphery thereof to provide an aperture thereat for the centrifugal discharge of foreign articles from the drum.

2. In a brake of the character described, a brake disk-drum secured to a rotary member of a machine; a disk face thereon having a flange extending on one side from the edge thereof, a disk shiftably supported on a stationary member of a machine and being adapted to frictionally engage a disk face of the drum, the periphery of said shiftable disk being spaced from the flange to provide an annular clearance thereat for the centrifugal ejection of foreign particles from the drum.

3. In a brake of the character described a disk drum; a brake disk arranged in operative relation to the drum; a floating lining disk between the active face of the drum and the brake disk; an operating element on which the said disk is pivotally supported; a support for said operating element; means to actuate said operating element to shift the disk into and out of operative position relatively to the drum; and a peripheral projection on said drum to protect the friction surfaces of the brake, said projection being so formed, and so spaced from the periphery of the brake disk, as to allow centrifugal ejection of foreign particles from said surfaces.

4. In a brake of the character described a disk drum attached on a rotating machine element having a hub thereon; a brake disk arranged in operative relation to the drum; an operating element on which the said disk is pivotally supported; a support for said operating element; means to actuate said operating element to shift the disk into and out of operative position relatively to the drum; and a discharge lip extending from said hub thru said drum and disk, to conduct fluid collected at said hub to a point outside of the disk.

5. The combination with a rotary disk, a brake disk, and an operating element to shift the brake disk into and out of engagement with the rotary disk; a stationary member having a cam thread thereon; a cam rotatably held on said member by said thread, said cam having an arcuate cam race on the outer periphery thereof; an end of said operating element being adapted to ride in said cam race, said cam race being inclined to move the operating element toward and away from said member, as the cam is raised or lowered by the turning of the cam on said thread, whereby the operating element is actuated.

6. The combination with a rotary disk, a brake disk, and an operating element to shift the brake disk into and out of engagement with the rotary disk; a stationary member having a cam thread thereon; a cam rotatably held on said member by said thread, said cam having an arcuate cam race on the outer periphery thereof; an end of said operating element being adapted to ride in said cam race, said cam race being inclined to move the operating element toward and away from said member, as the cam is raised or lowered by the turning of the cam on said thread, whereby the operating element is actuated; and a swivelable bracket to pivotally support said operating element.

7. In a brake mechanism including an axle, a steering wheel, and a steering knuckle, a primary disk, a secondary disk rotating with the wheel, means on the knuckle to tiltably and non-rotatably support the primary disk, and a series of means to move the said means so as to move the primary disk in frictional contact with said secondary disk.

8. In a brake mechanism including an axle, a steering wheel, and a steering knuckle, a primary disk, a secondary disk rotating with the wheel, a lever pivoted on the knuckle to be movable toward and away from the primary disk, means to tiltably and non-rotatably mount the primary disk on the lever in operative relation to the primary disk, and a series of means connected to the lever to move the lever so as to move the primary disk into frictional contact with the secondary disk.

9. In a brake mechanism including an axle, a steering wheel, and a steering knuckle, a primary disk, a secondary disk, and means to tiltably and non-rotatably support and move the primary disk into frictional contact with the secondary disk, comprising a fulcrumed element on the knuckles on which the primary disk is tiltably mounted, and a cam mechanism engaging said fulcrumed element to move the same.

10. A wheel movable about two axes, in combination with a disk brake for said wheel, means to non-rotatably support the disk brake so that the latter is tiltable around a third axis, and operating means for the brake to move said support.

11. A wheel movable about two axes, in combination with a disk brake for said wheel, means to non-rotatably support the disk brake so that the latter is tiltable around a third axis, and operating means for the brake to move said support, said third axis being at right angles to both of the first mentioned two axes.

12. The combination with a rotary disk, a brake disk, and an operating element to shift the brake disk into and out of engagement with the rotary disk, of a stationary member, a cam oscillatably held on said member, said cam having an arcuate cam race, so arranged that an end of said operating element rides on said cam race, said cam race being inclined to move said end of the operating element toward and away from said member as the cam is raised and lowered, and means to raise and lower said cam on said stationary member at will.

HARRY D. NEWHART.